United States Patent [19]

Davis et al.

[11] Patent Number: 6,071,996

[45] Date of Patent: *Jun. 6, 2000

[54] EPDM WALKWAY PAD COMPOSITIONS AND USES THEREFOR

[75] Inventors: James A. Davis; Joseph J. Kalwara, both of Indianapolis; Jerry C. Rose, Fishers, all of Ind.

[73] Assignee: Bridgestone/Firestone, Inc., Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/908,557

[22] Filed: Aug. 8, 1997

[51] Int. Cl.$^7$ ........................................................ C08K 3/03
[52] U.S. Cl. ........................ 524/482; 524/493; 524/495; 524/496; 525/192; 525/194; 525/197; 525/211; 525/240
[58] Field of Search ...................... 524/492, 493, 524/495, 496; 525/192, 194, 197, 211, 240

[56] References Cited

U.S. PATENT DOCUMENTS 5,389,715   2/1995   Davis et al. ........................... 524/505
5,468,550  11/1995   Davis et al. ........................... 428/327

*Primary Examiner*—Edward J. Cain
*Attorney, Agent, or Firm*—David G. Burleson; Daniel N. Hall; Rodney L. Skoglund

[57] ABSTRACT

A walkway pad composition comprises 100 parts by weight of an ethylene-propylene-diene terpolymer; from about 60 to 700 parts by weight of a filler selected from the group consisting of reinforcing and non-reinforcing materials and mixtures thereof, per 100 parts of the terpolymer; from about 40 to 175 parts by weight of a processing material and mixtures thereof, per 100 parts of the terpolymer; and from about 2 to 10 parts by weight of a cure package, per 100 parts of the EPDM terpolymer, the composition being devoid of any additional polymeric components. The 100 percent EPDM walkway pad composition has better low temperature properties and superior weathering resistance, and heat aging resistance compared to other walkway pad compositions which may include other polymeric components such as natural rubber, synthetic polyisoprene, styrene-butadiene rubber (SBR), polybutadiene, and butyl (IR) rubber. Up to about 25 parts by weight of ethylene-propylene copolymers may be substituted for the EPDM terpolymers.

12 Claims, 2 Drawing Sheets

EPDM WALKWAY PAD COMPOSITIONS AND USES THEREFOR

TECHNICAL FIELD

The present invention relates generally to roof walkway pads which are placed over a roofing membrane in order to protect the membrane from foot traffic, necessitated by excursions onto the covered roof to service, for instance, HVAC units, exhaust fans, smoke hatches, condenser units, window washing equipment, lightning protection units and the like. More particularly, the present invention relates to walkway pads comprising a polymer composition of matter containing 100 percent ethylene-propylene-diene terpolymers (EPDMs) or blends of EPDM with at least one ethylene-propylene copolymer (EPM) as the polymeric component therein. Specifically, the present invention relates to a cured walkway pad composition comprising from about 75 to 100 parts by weight ethylene-propylene-diene terpolymer and optionally from 0 up to about 25 parts by weight ethylene-propylene copolymer as the sole polymeric components. The walkway pad composition has excellent low temperature and heat aging properties as well as superior weathering resistance as compared to other walkway pad compositions which include other polymeric components such as natural rubber, synthetic polyisoprene, styrene-butadiene rubber (SBR), polybutadiene, and butyl (IR) rubber. The walkway pads of the present invention also meet the physical performance requirements desired of walkway pad compositions.

BACKGROUND OF THE INVENTION

Polymeric roof sheeting is often used as single-ply roofing membrane for covering industrial and commercial flat roofs. Such membranes are typically applied to the roof surface in a vulcanized or cured state.

Because of outstanding weathering resistance and flexibility, cured EPDM based roof sheeting has rapidly gained acceptance as an effective barrier to prevent the penetration of moisture through the roof being covered. While this material is suitable for covering the roof, and although it is capable of withstanding most traffic, it is customary to apply walkway pads, comprising other rubber or polymeric materials, directly onto the membrane defining a traffic pattern to areas of the roof to which travel is required. Typically, it is common to specify the use of walkway pads in areas where the frequency of traffic exceeds one excursion per month.

Presently, such walkway pads are typically made from various scrap rubber or claimed rubber materials such as recycled tires, or uncured workaway or uncured off-specification rubber compounds available from tire manufacturing facilities or various other industrial facilities which have various off-specification mechanical rubber goods available for use. These rubber compositions generally include such rubber materials as natural rubber, synthetic polyisoprene, styrene butadiene rubber (SBR), polybutadiene, butyl rubber (IIR) or the like or mixtures and blends thereof. Still other walkway pads have been produced from polymeric materials such as neoprene, polyvinyl chloride (PVC), chlorinated polyethylene (CPE), chlorosulfonated polyethylene and other similar olefin-type polymers.

Walkway pads are generally about 30 inches square and about 0.3 inches thick, although thicknesses generally range between about 0.25 and 0.5 inches. The pad provides upper and lower surfaces. The lower surface is generally relatively smooth while the upper surface may be textured in order to improve traction.

Walkway pads are currently applied to roofing membranes and other forms of roof covering material with the use of liquid adhesives or tape adhesives which are applied to the walkway pad prior to installing the walkway pad on the roof surface. This method typically involves cleaning and/or priming the walkway pad and then applying the liquid or adhesive tape to the pad, although alternative methods, such as set forth in U.S. Ser. No. 08/606,119 owned by the Assignee of record, are being explored. The applied adhesive, which is oftentimes used in the form of a seam tape which itself may include EPDM or EPM, keeps the walkway pad in place on the roof surface, and the walkway pad serves to protect the roof system, especially the membrane from foot traffic.

While various walkway pad compositions are known, the art has not heretofore recognized the benefit of a walkway pad composition containing 100 percent ethylene-propylene copolymers and terpolymers as the polymeric material used in the walkway pad composition. Such a walkway pad would certainly be compatible with the necessary adhesive tapes typically used to adhere the walkway pad to a roofing membrane, especially where the roofing membrane composition includes EPDM as its base polymer. Given the rapid acceptance of EPDM as the base rubber component in many roofing membranes today, the use of a similar EPDM as the sole polymer, or as the major component (with a minor amount of EPM) in a walkway pad composition would also appear desirable. Moreover, given the excellent weathering characteristics of EPDM, such an EPDM walkway pad composition would appear to provide a significant improvement in the art over current walkway pad compositions containing various other rubber or polymeric materials such as natural rubber, synthetic polyisoprene, styrene butadiene rubber (SBR), polybutadiene, butyl rubber (IIR) or the like or mixtures and blends thereof, as well as those compositions containing polymeric materials such as neoprene, polyvinyl chloride (PVC), chlorinated polyethylene (CPE), chlorosulfonated polyethylene and other similar olefin-type polymers.

Walkway pads should also meet standard physical property requirements. For instance, a preferred walkway pad should show no signs of cracking or splitting when folded around a one-inch bending radius at 40° F. The walkway pad should lay flat and remain flexible at temperatures as low as −20° C. Still further, the pad should be free of any mold release on the non-dimpled or textured side. Additional desirable physical properties include an elongation of at least 100 percent using ASTM-D-412; a brittleness temperature of at least −40° C. according to ASTM-D-2137; and a Shore "A" Hardness of between about 55 to 70 as tested in accordance with ASTM-D-2240.

Thus, the need exists for a walkway pad composition which has excellent low temperature and heat aging properties as well as superior weathering resistance as compared to other walkway pad compositions which include other polymeric components such as natural rubber, synthetic polyisoprene, styrene-butadiene rubber (SBR), polybutadiene, and butyl (IR) rubber. The walkway pads should also meet the physical performance requirements desired of walkway pad compositions. Desirably, such a fully compounded EPDM walkway pad composition would have a Mooney viscosity ranging between about 45 and about 60 Mooney units (ML/4 at 100° C.), and an elongation at break of at least 100 and, more preferably, at least 250 percent.

SUMMARY OF THE INVENTION

It is, therefore, an object of the present invention to provide a walkway pad containing 100 percent ethylenepropylene-diene terpolymers and copolymers of ethylene and propylene as the polymeric component thereof.

It is another object of the present invention to provide a walkway pad containing 100 percent EPDM.

It is yet another object of the present invention to provide a walkway pad comprising a polymer blend having a major amount of EPDM and a minor amount of EPM.

It is still another object of the present invention to provide a walkway pad, as above, which is both flexible and weather resistant.

It is a further object of the present invention to provide a walkway pad, as above, which provides superior weathering resistance, water absorption resistance, and heat aging performance as compared to other walkway pads containing natural rubber, synthetic polyisoprene, styrene butadiene rubber (SBR), polybutadiene, butyl rubber (IIR), or mixtures thereof.

It is yet a further object of the present invention to provide a walkway pad, as above, which may provide better adhesion to the seam adhesive tape used to attached the bottom surface of the walkway pad to the roofing membrane.

It is still a further object of the present invention to provide a walkway pad, as above, which can have a seam tape adhered to it without the use of a primer or adhesive.

In general, the objects of the present invention are accomplished by providing a walkway pad comprising 100 parts by weight of a polymeric material containing from about 75 to 100 parts by weight of an ethylene-propylene-diene terpolymer and from 0 to about 25 parts by weight of an ethylene-propylene copolymer; from about 60 to about 700 parts by weight of a filler selected from the group consisting of reinforcing and non-reinforcing materials and mixtures thereof, per 100 parts of the polymeric material; from about 40 to about 175 parts by weight of a processing material and mixtures thereof, per 100 parts of the polymeric material; and from about 2 to about 10 parts by weight of a cure package per 100 parts of the polymeric material, the walkway pad being devoid of any additional polymeric components. Preferably, the cure package contains sulfur and at least one organic (sulfur vulcanizing) accelerator. Moreover, it is preferred that from about 60 to 275 parts by weight carbon black or other reinforcing filler (per 100 parts of the polymeric material) be employed, while up to about 700 parts by weight of non-reinforcing filler such as clay, coal filler, or cryogrind EPDM material, per 100 parts of the polymeric material, may be employed.

Other objects of the invention may be accomplished by providing a walkway pad comprising 100 parts by weight of an ethylene-propylene-diene terpolymer; from about 60 to about 700 parts by weight of a filler selected from the group consisting of reinforcing and non-reinforcing materials and mixtures thereof, per 100 parts of EPDM terpolymer; from about 40 to about 175 parts by weight of a processing material and mixtures thereof, per 100 parts of EPDM terpolymer; and from about 2 to about 10 parts by weight of a cure package, per 100 parts of EPDM terpolymer, the walkway pad being devoid of any additional polymeric components.

At least one or more of the foregoing objects which shall become apparent to those skilled in the art are described in greater detail with reference to the drawings and specification which follows.

PREFERRED EMBODIMENT OF THE INVENTION

Figure 1:
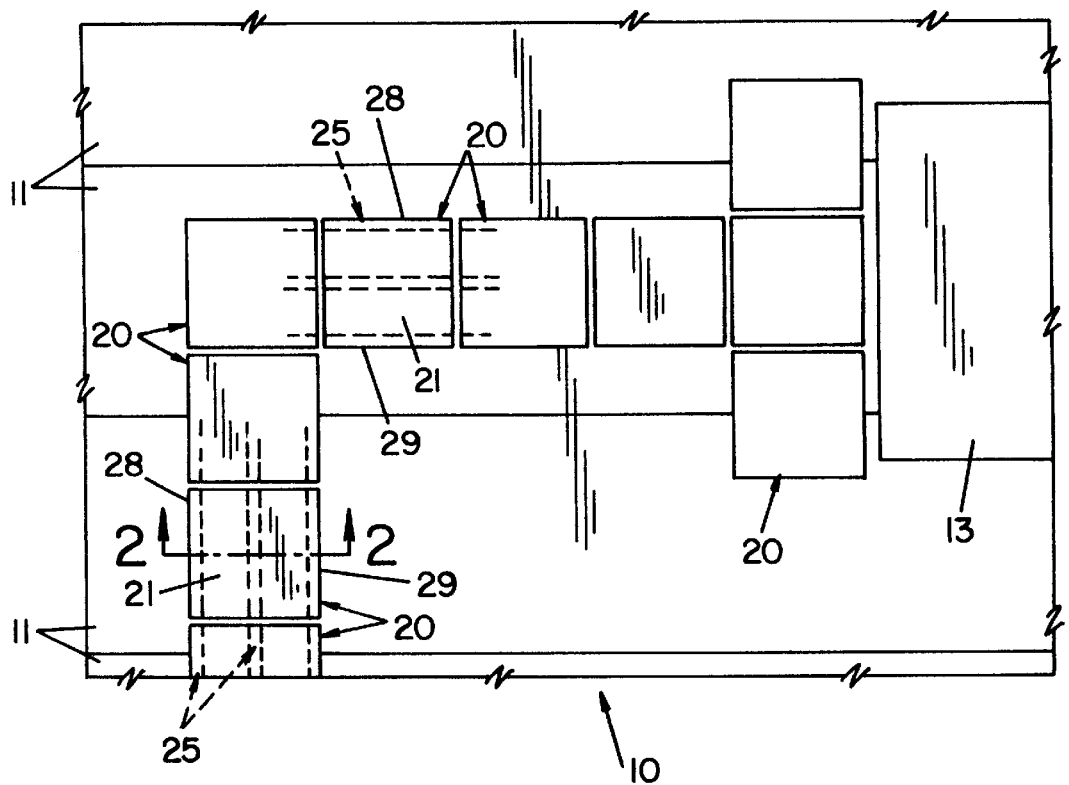
FIG. 1 is a top plan view of a portion of a roof covered with a roofing membrane and carrying a plurality of walkway pads.

With reference to the drawings, FIG. 1 depicts a portion of a flat roof 10, covered by a plurality of roof sheeting membranes 11. Upon the roof is a unit of roof-mounted equipment, such as an air conditioning apparatus 13. A plurality of walkway pads, generally 20, have been applied on the membranes 11 along a traffic path to apparatus 13.

Figure 2:
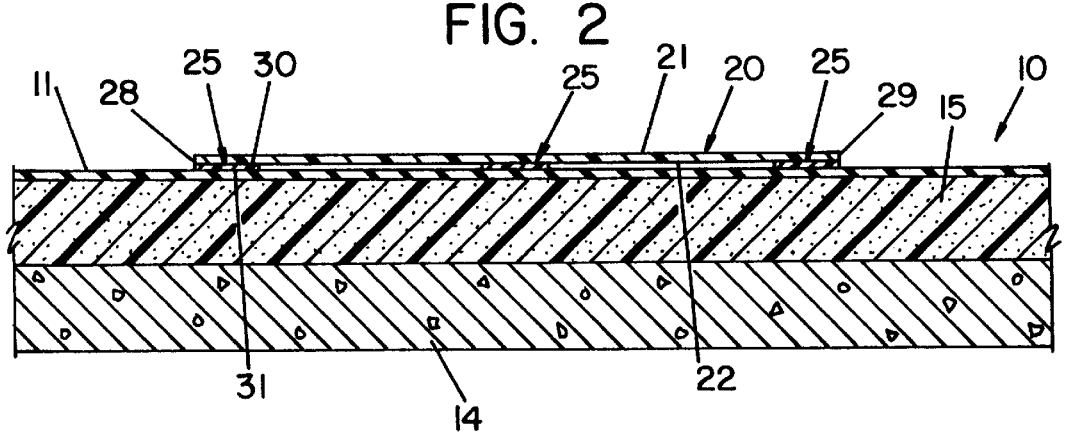
FIG. 2 is an enlarged side elevation, taken substantially along the lines 2—2 of FIG. 1, and depicting the roofing membrane and overlying walkway pad.

FIG. 2 depicts a section of the roof in cross-section, revealing the roof deck 14, which typically comprises metal, wood, concrete or the like, and a layer of insulation 15, placed thereover. The roof sheeting membranes 11 are placed down next, to which are applied the walkway pads 20, where desired. It is to be appreciated that the roof construction depicted is exemplary only and is not to be construed as constituting a limitation of the present invention. On the contrary, the walkway pads of the present invention can be employed on virtually any membrane covered roof, irrespective of the construction or method of applying and finishing the roof. Thus, for example, where membrane roofs are ballasted, it is customary to move aside the ballast in order to maximize the bond between the membrane and walkway pad. Subsequent to application of the pads, the ballast can be re-distributed over the membrane and around the walkway pads.

Figure 3:
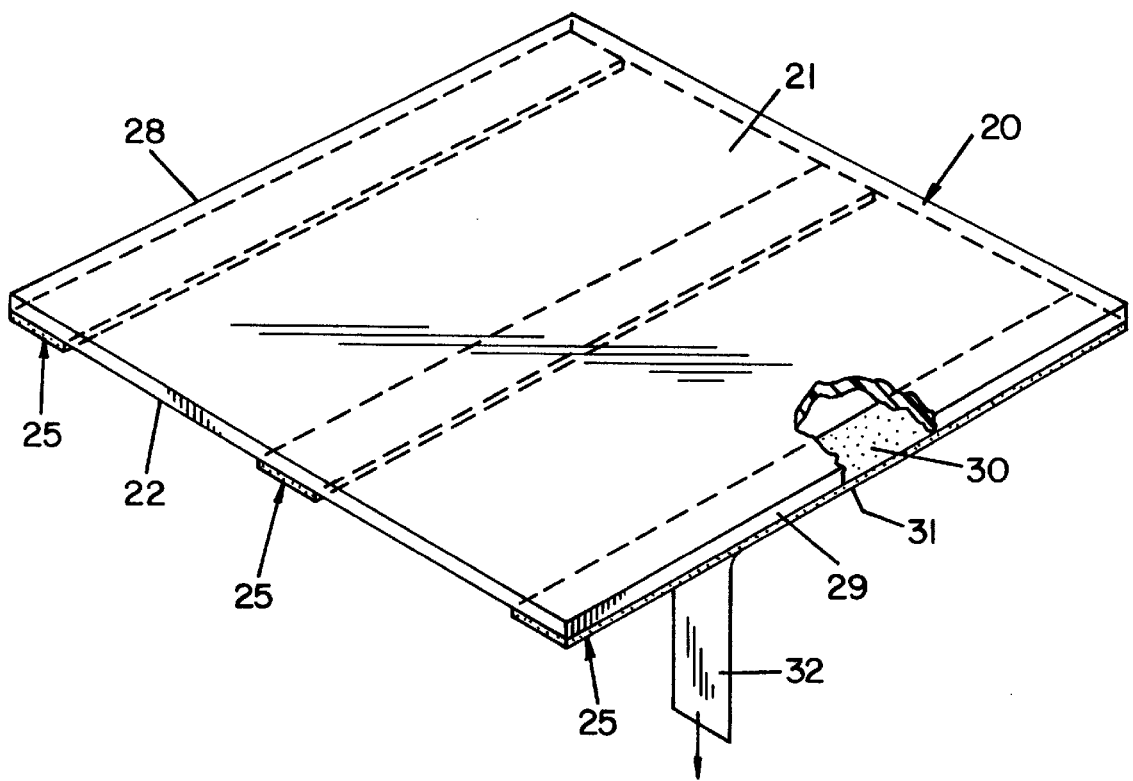
FIG. 3 is a perspective view of a walkway pad with seam tape pre-applied thereto.

In FIG. 3, the walkway pad 20 is depicted. As noted hereinabove, the walkway pad is about 30 inches square and 0.3 inches thick, although thicknesses generally range between about 0.25 and about 0.5 inches. The pad provides upper and lower surfaces, 21 and 22 respectively. Typically, the lower surface is relatively smooth while the upper surface can be textured to improve traction. An adhesive tape 25 is preferably applied in a series of strips such as at two of the edges 28 and 29, and at the center of the pad 20, adhered directly to the lower surface 22. The adhesive tape 20 provides upper and lower surfaces, 30 and 31 respectively, the upper surface 30 being applicable to the lower surface 22 of the pad, and the lower surface 31 being applicable to the roofing membrane 11. The adhesive or seam tape 25 may be added to the bottom surface 22 of the walkway pad 20 in the field just prior to positioning the walkway pad 20 on the roofing membrane 11, or the tape 25 may be applied to the bottom surface 22 of the walkway pad 20 at the factory, as part of the manufacturing operation. As the walkway pad is relatively clean shortly after manufacturing the factory applied version thereof, it is not necessary that separate cleaning and/or priming operations be made prior to adhering the tape 25 to the pad. However, adhesion between the tape and pad is maximized where there are clean and controlled conditions for application of the tape to the pad. Thus, as opposed to "in the field" applications, i.e., those on a roof, where the pads may become soiled or contaminated which, in turn, may interfere with the adhesion of the seam tape to the pad, manufacturing based application of the tape to the pad is preferred.

Typically, the adhesive or seam tapes employed have a release paper 32 applied to the lower surface 31 of the tape 25. If not pre-applied, there may also be another release paper (not shown) applied to the upper surface of the tape. The release paper 32 prevents exposure of the surface 31 to dust and the like prior to installation on the roof and, in certain instances, prevents adjacent stacked walkway pads from adhering together. Once in the field, i.e., the rooftop, all that is required is for the installer to prime the pad, if necessary, strip away the release paper(s), and place the adhesive on the walkway pad and/or onto the roof and then apply pressure which can be accomplished merely by walking over the pads or with the use of a roller, where such equipment is available and/or desirable.

The walkway pad of the present invention preferably contains 100 percent EPDM as the sole polymeric component of the composition. Optionally, however, the walkway pad may include minor amounts of EPM, generally up to about 25 percent of the polymeric component and more preferably, from about 5 to about 25 parts by weight. In any event, the composition of the walkway pad is devoid of any other rubber components or polymers. For example, there are no adhesive enhancing polymers or tackifiers.

The term EPDM is used in the sense of its definition as found in ASTM D-1418-94 and is intended to mean a terpolymer of ethylene, propylene and a diene monomer. Although not to be limited thereto, illustrative methods for preparing such terpolymers are found in U. S. Pat. No. 3,280,082 the disclosure of which is incorporated herein by reference. Other illustrative methods can be found, for example, in *Rubber and Chemistry & Technology*, Vol. 45, No. 1, Division of Rubber Chemistry (March 1992); Morton, *Rubber Technology*, 2d ed., Chapter 9, Van Nostrand Reinhold Company, New York (1973); *Polymer Chemistry of Synthetic Elastomers, Part II, High Polymer Series*, Vol. 23, Chapter 7, John Wiley & Sons, Inc. New York (1969); *Encyclopedia of Polymer Science and Technology*, Vol. 6, pp. 367–68, Interface Publishers, a division of John Wiley & Sons, Inc., New York (1967); Encyclopedia of Polymer Science and Technology, Vol. 5, p. 494, Interface Publishers, a division of John Wiley & Sons, Inc., New York (1966); and Synthetic Rubber Manual, 8th ed., International Institute of Synthetic Rubber Producers, Inc. (1980).

The preferred terpolymers of the present invention are substantially amorphous. That is, at least one EPDM terpolymer employed to make the walkway pad of the present invention should have less than about two percent crystallinity. More particularly, the EPDM walkway pad composition of the present invention should have about 85 to 100 parts by weight of at least one EPDM terpolymer having up to about two percent crystallinity, and 0 to about 15 parts by weight of an EPDM terpolymer having more than about two percent crystallinity. More preferably, the composition should include at least 95 parts and even more preferably 100 parts, by weight of amorphous EPDM having up to 2 percent crystallinity and, optionally, only up to about 5 parts by weight of crystalline or semi-crystalline EPDM having more than 2 percent crystallinity.

Any EPDM containing up to 2 percent crystallinity from the ethylene component and exhibiting the properties discussed hereinbelow should be suitable for use in the present invention. Typically, amorphous EPDMs having less than about 65 weight percent ethylene and from about 1.5 to about 4 weight percent of the diene monomer with the balance of the terpolymer being propylene or some other similar olefin type polymer is desired. Such EPDMs also preferably exhibit a Mooney viscosity (ML/1+4 at 125° C.) of about 40 to 60 and more preferably, of about 45 to 55. Preferably, the EPDM has from about 2 to about 4 weight percent unsaturation.

The diene monomer utilized in forming the EPDM terpolymers is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like.

Typical EPDM terpolymers having less than 2 weight percent crystallinity are available from Exxon Chemical Co. under the tradename Vistalon®, from Uniroyal Chemical Co. under the tradename Royalene®, and from DSM Copolymer under the tradename Keltan®. For example, one preferred amorphous EPDM terpolymer is Vistalon® MD-2727. This EPDM terpolymer has a Mooney viscosity (ML/1+4 at 125° C.) of about 44±5, an ethylene content of about 56 weight percent and about 2.1 weight percent unsaturation.

Another example of an EPDM having less than 2 weight percent crystallinity is available from Uniroyal Chemical Co. under the Royalene tradename and has a Mooney viscosity (ML/4 at 125° C.) of about 46±5, an ethylene content between 69 or 70 weight percent and about 2.8 weight percent unsaturation.

Still another example of an EPDM having less than 2 weight percent crystallinity is available from DSM Copolymer under the Keltan tradename. Such an amorphous EPDM has a Mooney viscosity (ML/4 at 125° C.) of about 50±5, an ethylene content of about 69 weight percent and about 2.6 weight percent unsaturation.

It will be appreciated that the subject walkway pad may comprise 100 parts by weight of an amphorous EPDM as the sole elastomeric polymer for the composition. However, it is also contemplated that more than one EPDM having less than 2 weight percent crystallinity may be employed.

When EPDM terpolymers having more than 2 percent crystallinity from the ethylene component are employed, these EPDMs preferably should contain at least about 65 weight percent ethylene and from about 2 to about 4 weight percent of the diene monomer with the balance of the terpolymer being propylene or some other similar olefin-type polymer. Although not necessarily limiting, such EPDMs also should exhibit a Mooney viscosity (ML/1+4 at 125° C.) of about 45 to 50 and should have less than about 4 weight percent unsaturation. Non-conjugated dienes like those exemplified above can also be used for these types of EPDMs as well.

A typical EPDM having more than 2 percent crystallinity is available from Exxon Chemical Co. under the tradename Vistalon® 3708. This EPDM terpolymer has a Mooney Viscosity (ML/1+4 at 125° C.) of about 52±5, an ethylene content of about 69 weight percent and about 3.2 weight percent unsaturation.

By reducing the amount of crystalline, high ethylene-containing EPDM terpolymer to less than about 15 parts by weight, and more preferably, to 0 to about 5 parts by weight in combination with increasing the amount of non-crystalline, amorphous EPDM terpolymer to at least about 85 parts by weight, and more preferably, to about 95 to 100 parts by weight, the resulting cured walkway pad will lay flat and be more flexible as compared to commercial walkway pad compositions currently available.

The term EPM is used in the sense of its definition as found in ASTM D-1418-94 and is intended to mean a copolymer of ethylene and propylene. The preferred copolymers contain from about 60 to 72 weight percent ethylene with the balance, to total 100 weight percent, being propylene. A typical EPM suitable for use in the present invention is available from DSM Copolymer under the tradename Keltan® 740. This EPM has a Mooney viscosity (ML/4 at 125° C.) of about 63 and an ethylene content of about 60 weight percent.

Other EPMs are available from DSM Copolymer under the tradename Keltan® and from Exxon Chemical Co. under the tradename Vistalon®. For instance, Keltan® 3300A and 4200A have Mooney viscosities (ML/4 at 125° C.) of about 35 and about 40, respectively, while Vistalon® 808 and 878 have Mooney viscosities (ML/4 at 125° C.) of about 46 and 53, respectively. These ethylene-propylene copolymers are available in either crumb or pellet form. The advantage of using an EPM is that the resultant walkway pads should be flexible and exhibit excellent long-term rooftop aging properties.

In addition to the EPDM terpolymers and EP copolymers employed, the walkway pad composition of the present invention may also include fillers, processing oils and curatives as well as other optional components including cure activators, all of which are discussed hereinbelow.

With respect to the fillers, suitable fillers are selected from the group consisting of reinforcing and non-reinforcing materials, and mixtures thereof, as are customarily added to rubber. Examples include both inorganic and organic materials such as carbon black, ground coal fines, cryogenically or ambiently ground EPDM rubber, and clay as well as other mineral fillers, and the like. Generally, preferred fillers include carbon black and cryogenically or ambiently ground rubber.

Carbon black, a reinforcing filler, is used in an amount of from about 60 parts to about 275 parts per 100 parts of polymer (phr), preferably in an amount of about 85 to about 175 phr. The carbon black useful herein may be any carbon black suitable for the purposes disclosed hereinbelow. Preferred are furnace blacks such as GPF (general purpose furnace), FEF (fast extrusion furnace) and SRF (semi-reinforcing furnace). Most preferred is N650 HiStr GPF black, a petroleum-derived, black reinforcing filler having an average particle size of about 60 nm and a specific gravity of about 1.80 g/cc.

The ground coal utilized as a filler in the walkway pad compositions of the present invention is a dry, finely divided black powder derived from a low volatile bituminous coal. The ground coal has a particle size ranging from a minimum of 0.26 microns to a maximum of 2.55 microns with the average particle size of 0.69±0.46 as determined on 50 particles using Transmission Electron Microscopy. The ground coal produces an aqueous slurry having a pH of about 7.0 when tested in accordance with ASTM 1512. A preferred ground coal of this type is designated Austin Black which has a specific gravity of about 1.255±0.03, an ash content of about 4.58% and a sulfur content of about 0.65%. Finely ground coal is commercially available from Coal Fillers, Inc. of Bluefield, Va. Amounts range from about 5 to about 65 phr with about 15 to about 35 phr being preferred when used.

Essentially any cryogenically or ambiently ground rubber may be employed as a filler in the composition of the invention. The preferred cryogenically or ambiently ground rubbers are cryogenically or ambiently ground EPDM, butyl, neoprene and the like. A preferred cryogenically or ambiently ground rubber is a ground EPDM rubber. The preferred ground EPDM rubber is a fine black rubbery powder having a specific gravity of about 1.16±0.015 g/cc and a particle size ranging from about 30 to about 300 microns with an average particle size ranging from about 40 to about 80 microns. When carbon black is included in the walkway pad composition, the amount of ground rubber may range from about 25 to about 100 parts per 100 parts of polymeric material, i.e., EPDM and, optionally, EPM. In the absence of any carbon black, the amount of cryogenically or ambiently ground rubber may exceed 600 parts by weight per 100 parts polymeric material (phr).

Non-black mineral fillers may also be employed and, in the past, have included those fillers selected from the group consisting of hard clays, soft clays, chemically modified clays, calcined clays, mica, talc, alumina trihydrates, calcium carbonate, titanium dioxide, silica, and certain mixtures thereof. In some instances, these fillers may completely or partially replace "black" fillers, i.e. carbon black and other petroleum-derived materials.

Some four basic types of clays are normally used as fillers for rubber elastomers. The different types of clay fillers include airfloated, water washed, calcined and surface treated or chemically modified clays.

The airfloated clays are the least expensive and most widely used. They are divided into two general groups, hard and soft, and offer a wide range of reinforcement and loading possibilities. Hard Clays may be used in the amount of about 20 parts to about 300 parts per 100 parts of rubber (phr), preferably in an amount from about 65 to 210 phr. Preferred airfloated hard clays are commercially available from J. M. Huber Corporation under the tradenames Suprex®, Barden R®; and LGB®.

The airfloated soft clays may be used in amounts ranging from about 20 parts to about 300 parts per 100 parts of rubber (phr), preferably in an amount from about 75 to 235 phr. The preferred airfloated soft clays are available from J. M. Huber Corporation under the tradenames Paragon® and K-78® or from Evans Clay Company under the tradename Hi-White R®. Particularly preferred is Hi-White R®, an air-floated soft clay characterized as having a pH of about 6.25±1.25, an oil absorption of 33 grams/100 grams of clay, a particle size of 68% (±3) being finer than two microns, and a specific gravity of about 2.58.

Water washed clays are normally considered as semi-reinforcing fillers. This particular class of clays is more closely controlled for particle size by the water-fractionation process. This process permits the production of clays within controlled particle size ranges. The preferred amounts of water washed clays are very similar to the preferred amounts of airfloated soft clays mentioned hereinabove. Some of the preferred water washed clays include Polyfil® DL, Polyfil® F, Polyfil® FB, Polyfil® HG-90, Polyfil® K and Polyfil® XB; all commercially available from J. M. Huber Corporation.

The third type of clay includes the calcined clay. Clays normally contain approximately 14 percent water of hydration, and most of this can be removed by calcination. The amount of bound water removed determines the degree of calcination. The preferred ranges of calcined clays are very similar to the preferred amounts of airfloated hard clays mentioned hereinabove. Some of the preferred calcined clays include Polyfil® 40, Polyfil® 70, and Polyfil® 80, all commercially available from J. M. Huber Corporation.

The last type of clay includes chemically modified reinforcing clays. Cross-linking ability is imparted to the clay by modifying the surface of the individual particles with a polyfunctional silane coupling agent. Chemically modified clays are used in the amount of from about 20 parts to about 300 parts per 100 parts of rubber(phr), preferably in an amount from about 60 to 175 phr. Normally, the specific gravity of most of these clays is about 2.60 at 25° C. The preferred chemically modified clays are commercially available from J. M. Huber Corporation and include those available under the tradenames Nucap®, Nulok® and Polyfil®. Another preferred chemically modified clay is commercially available from Kentucky-Tennessee Clay Company under the tradenames Mercap® 100.

As an alternative to the clays, a silicate may have utility in the present invention. For example, synthetic amorphous calcium silicates such as those which are commercially available from the J. M. Huber Company under the trademark Hubersorb 600 may be utilized. Hubersorb 600 is characterized as having an average particle size of 3.2 micrometers (by the Coulter Counter Method), oil absorption of 450 ml/100 g of calcium silicate, a BET (Brunaver-Emmet-Teller nitrogen adsorption procedure) surface area of 300 $m^2/g$ and a pH (5% solution) of 10.

Other silicates which may be used in the composition of the present invention include precipitated, amorphous sodium aluminosilicates available from the J. M. Huber Company under the tradenames Zeolex 23 and Zeolex 80. Zeolex 23 has a BET surface area of about 75 $m^2/g$, a refractive index at 20° C. of about 1.51, and a pH of about 10.2 determined by slurrying 20 grams of silicate with 80 grams of deionized water. In comparison, Zeolex 80 has a BET surface area of about 115 $m^2/g$, a refractive index at 20° C. of about 1.55, and a pH of about 7. The average particle size, density, physical form and oil absorption properties are similar to each other.

Reinforcing silicas may also be used as non-black fillers, preferably in conjunction with one or more of the chemically modified clays noted hereinabove. Silica (silicon dioxide) utilizes the element silicon and combines it in a very stable way with two oxygen atoms. Generally, silicas are classed as wet-processed, hydrated silicas because they are produced by a chemical reaction in water, from which they are precipitated as ultrafine, spherical particles. However, there are in reality two different forms of silica, crystalline and amorphous (noncrystalline). The basic crystalline form of silica is quartz, although there are two other crystalline forms of silica that are less common—tridymite and cristobalite. On the other hand, the silicon and oxygen atoms can be arranged in an irregular form as can be identified by X-ray diffraction. This form of silica is classified as amorphous (noncrystalline), because there is no detectable crystalline silica as determined by X-ray diffraction. The most preferred forms of silica, i.e., a fine particle, hydrated amorphous silica, are available from PPG Industries, Inc. and J. M. Huber Corporation in a low dust granular form. These silicas typically are available from PPG Industries under the tradenames HiSil® and Silene®. Reinforcing silicas are generally characterized in terms of surface area ($m^2/g$ by the BET procedure) or particle size as determined by either electron microscopy or the Coulter Counter Method.

These silicas can be employed in the amount of about 10 parts to about 110 parts per 100 parts of rubber (phr), preferably in an amount from about 10 to 30 phr. The useful upper range is limited by the high viscosity imparted by fillers of this type.

Still other fillers include calcium carbonate, titanium dioxide, talc (magnesium silicate), mica (mixtures of sodium and potassium aluminum silicate) and alumina trihydrate. The amount of these fillers may vary significantly depending upon the number and amount of other particular fillers employed, but typically are employed in amounts ranging from about 5 to about 200 parts by weight, per 100 parts of polymeric material.

With respect to the processing material, it is included to improve the processing behavior of the composition (i.e. to reduce both mixing time and compound viscosity as well as to increase the rate of sheet formation) and includes processing oils, waxes and the like. The process oil is included in an amount ranging from about 40 parts to about 125 parts process oil phr, preferably in an amount ranging from about 75 parts to about 115 phr. A preferred processing oil is a paraffinic oil, e.g. Sunpar 2280, which is available from the Sun Oil Company. Other petroleum derived oils including naphthenic oils are also useful.

In addition to the above ingredients which are mixed to form a masterbatch in the preferred embodiment, cure activators such as zinc oxide and stearic acid may optionally be added to and made a part of the rubber masterbatch. Amounts of these activators can vary depending upon processing needs, but it is conventional to add about 5 phr zinc oxide and about 1 phr stearic acid to the rubber masterbatch.

A cure package may also be included. Preferably, the cure package contains sulfur and one or more organic, preferably sulfur vulcanizing, accelerators. The cure package is typically prepared and added to the EPDM walkway pad composition after mixing the masterbatch. The cure package for the walkway pad composition of the present invention may range from about 2 phr to about 10 phr with the preferred amounts ranging from about 3 to about 7 phr.

As part of the cure package, sulfur is preferably employed in amounts of about 0.7 to 1.5 phr, with about 1 phr being most preferred. This amount of sulfur is similar to the amount of sulfur used in other EPDM rubber compositions.

In addition, the cure package provides one or more vulcanizing accelerators including thiuram monosulfides and disulfides such as tetramethylthiuram monosulfide (TMTMS); tetrabutylthiuram disulfide (TBTDS); tetramethylthiuram disulfide (TMTDS); tetraethylthiuram monosulfide (TETMS); and the like; benzothiazole sulfenamides such as N-oxydiethylene-2-benzothiazole sulfenamide; N-cyclohexyl-2-benzothiazole sulfenamide; N,N-diisopropyl-2-benzothiazolesulfenamide; N-tert-butyl-2-benzothiazole sulfenamide (TBBS) and the like; 2-mercaptoimidazoline; N,N-diphenyl-guanadine; N,N-di-(2-methylphenyl)guanadine; 2-mercaptobenzothiazole; 2-(morpholinodithio)-benzothiazole disulfide; zinc 2-mercaptobenzothiazole and the like; a sulfur donor such as 4,4'-dithiodimorpholine and the like; benzothiazyl disulfide (MBTS); dithiocarbamates such as tellurium diethyldithiocarbamate; copper dimethyldithiocarbamate; bismuth dimethyldithio-carbamate; cadmium diethyldithiocarbamate; lead dimethyldithiocarbamate; zinc diethyldithiocarbamate; zinc dimethyldithiocarbamate and zinc dibutyldithiocarbamate (ZDBDC).

It should be appreciated that the foregoing list is not exclusive, and that other vulcanizing agents known in the art to be effective in the curing of EPDM terpolymers may also be utilized. For a list of additional vulcanizing agents, see *The Vanderbilt Rubber Handbook*, referenced hereinabove. However, it will be appreciated that thioureas such as ethylene thiourea; N,N-dibutylthiourea; N,N-diethylthiourea and the like as well as various hexasulfides such as dipentamethylene thiuram hexasulfide (DPTH) are not specifically listed above. That is because the present invention may be devoid of thioureas and hexasulfides in the walkway pad composition, but still maintain its physical properties.

Moreover, it has been found that the use of a combination of MBTS and ZDBDC as accelerators offers a number of advantages over other accelerators such as the thiuram accelerators including tetramethylthiuram monosulfide (TMTMS) and tetramethylthiuram disulfide (TMTDS), and certain sulfenamide accelerators such as, for example, t-butyl-2-benzothiazyl sulfenamide (TBBS). This combination has been found to improve tear resistance. Still further, this combination provides a lower raw material cost than these other accelerators listed hereinabove.

Other optional ingredients include, for example, conventional amounts of other conventional additives, such as zinc oxide, stearic acid, antioxidants, processing aids, homogenizing agents, antiozonants, flame retardants, and the like. For instance, one particular processing aid/homogenizing agent suitable for use in the present invention is a mixture of dark aromatic hydrocarbon resins available from the Struktol Company of Stow, Ohio under the tradename Struktol 40MS. This processing aid is used to improve the dispersion of the fillers such as carbon black, ground rubber particles, coal filler, mineral fillers and the like. Struktol 40MS has a softening point of about 100° C., an ash content of less than 2 percent by weight, a bulk density of about 650 grams/liter and a specific gravity of about 1.06.

The compounding ingredients can be admixed, utilizing an internal mixer (such as a Banbury mixer), an extruder, and/or a two-roll mill, or other mixers suitable for forming viscous, relatively uniform admixtures. When utilizing a type B Banbury internal mixer, in a preferred mode, the dry or powdery materials such as the mineral fillers as well as zinc oxide, stearic acid and antioxidant of the present invention are added first, followed by the liquid process oil and finally the polymer, i.e., EPDM (this type of mixing can be referred to as an upside-down mixing technique). The resultant mixture forms a masterbatch to which the cure package can then be added. The cure package typically includes sulfur and one or more organic accelerators.

The resulting admixture may then be sheeted to a thickness ranging from about 0.25 inches to about 0.50 inches, and preferably to about 0.3 inches, by conventional sheeting methods, for example, milling, calendering or extrusion. The sheeting may then be cut into thick, resilient mats or pads having widths ranging from about 20 to about 40 inches and lengths ranging from about 20 inches to about 40 inches. Preferably, the resultant walkway pad is about 30 inches square.

The unvulcanized rubber walkway pad composition thus prepared is shaped into a desired form by, for instance, extruders, calender rolls, or compression presses, and is vulcanized simultaneously by either compression molding or injection molding techniques. Ordinarily, it is common practice to cure the unvulcanized rubber walkway pad by heating the vulcanizate to a temperature of about 150° C. to about 250° C. for anywhere from about 5 to about 20 minutes.

The resultant walkway pad of the present invention will show no signs of cracking or splitting and will remain flexible at temperatures as low as −20° C. Moreover, the pad will be free of any mold release on the non-dimpled side thereof. Other physical properties include a minimum percent elongation of 100 upon testing in accordance with ASTM D-412, a brittleness temperature of at least −40° C. when tested in accordance with ASTM D-2137, and a Shore A hardness of about 55 to 70 as tested in accordance with ASTM-D-2240. Since it is made from EPDM, the resultant walkway pad is known to exhibit excellent weathering properties and water absorption resistance as well as outstanding heat aging performance.

The walkway pad of the present invention is also compatible with various adhesives and sealants commonly used to adhere EPDM membranes together. It is believed that this will make it easier for the installer to place the walkway pad onto the roof. The walkway pad of the present invention may be applied to roofing membranes or other forms of roof covering material by one of at least two ways using liquid adhesives or tape adhesives such as seam tapes. Seam tapes typically are about 3 to 7 inches wide and are wound on release paper in roll form. These tapes may be made from an EPDM composition as well and may be applied to the bottom or lower surface of the walkway pad immediately after removal of the pad from the mold during the manufacturing process, in which case no cleaning or priming of the walkway pad may be required. Alternatively, the tape may be applied to the walkway pad prior to installing the walkway pad on the roof surface. This method typically involves cleaning and/or priming the walkway pad and then applying the liquid or adhesive tape to the pad. The walkway pad may then be applied to the rooftop membrane. The adhesive keeps the walkway pad in place on the roof surface, and the walkway pad serves to protect the roof system, especially the membrane from foot traffic.

In order to demonstrate practice of the present invention, several test walkway pad compositions were prepared and subjected to various physical property tests, as will now be set forth in detail. In the first six Examples, 85 parts by weight of one particular amorphous EPDM terpolymer, Vistalon® MD-2727, was added with 15 parts by weight of a second, semi-crystalline EPDM terpolymer, Vistalon® 3708, to form the polymeric component of the present invention. In Example Nos. 7–11, 100 percent of an amorphous EPDM terpolymer, available from Uniroyal Chemical Co. under the tradename Royalene® was used as the sole polymeric material of the composition.

The following examples are submitted for the purpose of further illustrating the nature of the present invention and are not to be considered as a limitation on the scope thereof. Parts and percentages are by weight, unless otherwise indicated.

TABLE I

EPDM Walkway Pad Compositions (Parts per hundred rubber hydrocarbon by weight)

| | Compound Nos. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Amorphous EPDM[a] | 85 | 85 | 85 | 85 | 85 | 85 | — | — | — | — | — | — |
| Semi-Crystalline | 15 | 15 | 15 | 15 | 15 | 15 | — | — | — | — | — | — |

TABLE I-continued

EPDM Walkway Pad Compositions (Parts per hundred rubber hydrocarbon by weight)

| | Compound Nos. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| EPDM[b] | | | | | | | | | | | | |
| Amorphous EPDM[c] | — | — | — | — | — | — | 100 | 100 | 100 | 100 | 100 | 50/50 |
| GPF Carbon Black[d] | 110 | 110 | 110 | 110 | 110 | 110 | 155.75 | 155.75 | 140 | 130 | 140 | 140 |
| HAF Carbon Black[e] | — | — | — | — | — | — | 10 | 10 | 10 | 10 | 10 | 10 |
| Cryogenically ground Rubber[f] | 100 | 200 | 300 | 400 | 500 | 600 | — | — | — | — | — | — |
| Processing Aid[g] | — | — | — | — | — | — | 2.5 | 2.5 | 2.5 | 3 | 2.5 | 2.5 |
| Processing Oil[h] | 80 | 80 | 80 | 80 | 80 | 80 | 95 | 100 | 110 | 115 | 105 | 105 |
| Clay Filler[i] | — | — | — | — | — | — | 15 | 15 | 25 | 30 | 25 | 25 |
| Coal Filler | — | — | — | — | — | — | 20.05 | 20.05 | 20.05 | 20.05 | 20.05 | 20.05 |
| Zinc Oxide | 5 | 5 | 5 | 5 | 5 | 5 | 5 | 5 | 5 | 5 | 5 | 5 |
| Stearic acid | 1 | 1 | 1 | 1 | 1 | 1 | 1.5 | 1.5 | 1.5 | 1.5 | 1.5 | 1.5 |
| Sulfur | 0.95 | 0.95 | 0.95 | 0.95 | 0.95 | 0.95 | 0.95 | 0.95 | 0.95 | 0.95 | 0.9 | 0.95 |
| DPTH[j] | 0.4 | 0.4 | 0.4 | 0.4 | 0.4 | 0.4 | — | — | — | — | — | — |
| TBBS[k] | 1 | 1 | 1 | 1 | 1 | 1 | — | — | — | — | — | — |
| MBTS | — | — | — | — | — | — | 2.3 | 2.3 | 2.35 | 2.4 | 2.4 | 2.4 |
| ZDBDC | — | — | — | — | — | — | 1.05 | 1.15 | 1.4 | 1.5 | 1.7 | 1.6 |
| TOTAL | 398.35 | 498.35 | 598.35 | 698.35 | 798.45 | 898.55 | 409.1 | 414.2 | 418.75 | 419.4 | 414.1 | 414.0 | a. Vistalon MD 2727
b. Vistalon 3708
c. Royalene spac Proprietary Amporphous EPDM available from Uniroyal Chemical under the tradename Royalene. In example 12, this EPDM is blended with proprietary, wide-spec.amorphous EPDM available from Goldsmith and Eggleton of Wadsworth, Ohio.
d. N-650 HiStr GPF Black
e. N-330 HAF Black
f. EPDM Cyrogrind (100 Mesh)
g. Struktol 40 MS
h. Sunpar 2280 Process Oil
i. Hi-White R Clay
j. Sulfads
k. Santocure NS The examples illustrated in Table I comprise EPDM walkway pad compositions. Examples 1–6 comprise 100 parts by weight of EPDM terpolymer, about 110 parts carbon black, from about 100 to about 600 parts cryogenically ground EPDM rubber, about 80 parts processing oil, about 5 parts zinc oxide, and about 1 part stearic acid to form a rubber masterbatch. About 0.95 parts by weight sulfur with about 1.4 parts, in total, of sulfur vulcanizing accelerators are then added to the rubber masterbatch.

Examples 7–11 include 100 parts amorphous EPDM, and from about 140 to about 165.75 parts by weight of two types of carbon black. From about 95 to about 115 parts by weight of a processing oil and about 2.5 parts of a processing aid is also included in these compositions. Further, about 20 parts of coal filler is included, along with about 5 parts zinc oxide, and about 1.5 parts stearic acid to form the rest of the rubber masterbatch. The cure package again includes about 0.95 parts by weight sulfur with about 3.35 to about 4.1 parts, in total, of sulfur vulcanizing accelerators being added. The cure package in these compositions do not include a hexasulfide (DPTH).

Lastly, Example 12 includes about 50 parts of the same amorphous EPDM employed in Examples 7–11 and about 50 parts of a different amorphous EPDM. However, the rest of the ingredients essentially parallel those provided in Example 12. These include about 150 parts by weight of two types of carbon black, about 105 parts by weight of a processing oil and about 2.5 parts by weight of a processing aid. Further, about 20 parts coal filler is included, along with about 5 parts zinc oxide and 1.5 parts stearic acid. The cure package again includes about 0.95 parts by weight sulfur with about 4 parts, in total, of sulfur vulcanizing accelerators being incorporated in the walkway pad composition.

Complete formulations for each example appear in Table I hereinabove with all parts given on the basis of parts per hundred parts of rubber (phr) by weight, unless otherwise specified.

The cure characteristics, viscosity and scorch measurements, stress-strain data, Die C tear properties, and hardness of the walkway pad compositions were then determined for each example of the present invention. The cure characteristics (cure rate, cure state, etc.) of the fully compounded walkway pad compositions were determined by means of a Monsanto Oscillating Disc Rheometer in accordance with ASTM Method D 2084-81. The specific conditions employed involved using a mini-die attachment operating at 100 rpm. with the die oscillating at a three degree arc at 160° C. during actual testing.

The compound processing characteristics of the walkway pad compositions were determined using a Monsanto Mooney Viscometer (MV-2000E) Tester. The specific test conditions involved using a large rotor (1.5-inches in diameter) die attachment operating at 135° C. during the test procedure. The Mooney viscometer provided useful information involving the compound viscosity and processing (scorch) safety of the fully compounded EPDM walkway pad compositions. This test method can also be used to determine incipient cure time and the rate of cure during the very early stages of vulcanization.

In testing, each of the walkway pad compositions (Examples 1–12) were compression molded to a thickness of about 45 mils and cut into a plurality of test specimens as discussed hereinbelow. The initial Instron jaw separation was two inches. Each test specimen was tested using a crosshead speed of 20 inches per minute on a table model 4301 Instron Universal Tester. The Universal Tester (a testing machine of the constant rate-of-jaw separation type)

is equipped with suitable grips capable of clamping the test specimens, without slippage.

For testing purposes, dumbbell-shaped specimens were also cut from individual 45-mil thick flat sheets of the walkway pad material according to ASTM D-412 (Method A—dumbbell and straight specimens). Modulus, tensile strength and elongation at break measurements were obtained using the table model Instron® Tester, Model 4301, and the test results were calculated in accordance with ASTM D-412. All dumbbell test specimens were allowed to set at room temperature for about 24 hours before testing was carried out at 23° C. using the appropriate metal die (90° angle die C). Die C tear specimens were also cut and tested under the same conditions as the dumbbell-shaped specimens. Again, the test specimens were allowed to set for about 24 hours before testing was carried out at 23° C.

Shore "A" hardness, which measures the hardness of the cured rubber vulcanizate, was conducted at 23° C. in accordance with ASTM D-2240-91. Hardness is measured by penetrating the surface of a cured rubber vulcanizate with an indentor. Hardness measurements are based upon initial (instantaneous) indentation or indentation after a specified period of time (dwell time), or both. Each cured rubber vulcanizate is allowed to set for about 24 hours prior to testing.

Physical properties of each of the rubber compounds were measured and have been reported in Table II hereinbelow. The resultant walkway pad compositions in Examples 1–6 (Table I) can be characterized as having tensile at break in excess of 665 psi or higher and die C tear values ranging between 113 and 153 lbs./inch at 23° C. The hardness of Examples 1–6 ranged between about 63 and 65. The elongation at break values certainly exceeded the minimum limit of 100% elongation at break at 23° C.

Examples 7–12 also displayed excellent physical properties. Examples 7–12 feature two types of carbon black, replacing the cryogenically ground rubber, i.e., EPDM Cryogrind (100 mesh). The Examples also include higher paraffinic process oil loadings and an increased amount of sulfur vulcanizing accelerators. Tensile strength values for Examples 8, 11 and 12 ranged between 1236 and 1326 psi, while the die C tear properties at 23° C. were about 199 lbs./inch or higher. Increasing the load of process oil reduced cured compound hardness values to about 65. Die C tear properties were enhanced by replacing the cryogenically ground EPDM rubber, a filler, with two types of carbon black. The overall cure rates at 160° C. were increased as the level of the sulfur vulcanizing accelerator increased and compound viscosity was reduced to the desired level (30–35 Mooney units at 135° C.) by increasing the amount of paraffinic oil in the walkway pad (see Examples 11 and 12). These and other physical properties are presented in Table II hereinbelow.

TABLE II

EPDM Walkway Pad Physical Properties

| | \multicolumn{12}{c}{Compound Nos.} | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Rheometer at 320° F. (160° C.), mini-die, 3° Arc | | | | | | | | | | | | |
| Scorch time, minutes | 4:49 | 4:44 | 4:27 | 4:45 | 4:42 | 4:45 | 4:32 | 4:26 | 5:04 | 6:51 | 4:38 | 3:25 |
| Time to 50% cure, minutes | 8:04 | 7:57 | 7:36 | 7:42 | 7:32 | 7:09 | 9:32 | 9:23 | 10:01 | 11:55 | 9:19 | 7:08 |
| Time to 90% cure, minutes | 21:13 | 21:08 | 21:18 | 21:54 | 21:43 | 21:20 | 22:38 | 22:54 | 22:28 | 22:37 | 21:31 | 19:1 |
| Minimum torque, lb.-inch | 9.1 | 12.95 | 14.9 | 16.9 | 16.9 | 19.5 | 5.67 | 5.34 | 3.7 | 2.5 | 4.05 | 4:23 |
| Maximum torque, lb.-inch | 30.7 | 28.8 | 28.6 | 27.4 | 26.9 | 27.9 | 43.16 | 40.1 | 35.5 | 28.33 | 37.7 | 39.3 |
| Mooney Scorch at 275° F. (135° C.) - large rotor | | | | | | | | | | | | |
| Minimum Viscosity, Mu | 40.6 | 49.4 | 57.7 | 64.1 | 66.1 | 73.7 | — | 41.8 | — | — | 31.8 | 32.5 |
| T5, minutes | 18.85 | 19.15 | 20.2 | 28.3 | 26.5 | 37.1 | — | 11.54 | — | — | 12.12 | 11.1 |
| T35, minutes | 28.5 | 47.8 | >60 | >60 | >60 | >60 | — | 19.01 | — | — | 20.48 | 19:6 |
| Stress-Strain Properties at 73° F. (23° C.) - slabs cured 40 minutes at 320° F. (160° F.) | | | | | | | | | | | | |
| 100% Modulus, psi | 285 | 285 | 272 | 264 | 255 | 240 | — | 555 | — | — | 455 | 445 |
| 300% Modulus, psi | 842 | 875 | 830 | 774 | — | 710 | — | 1240 | — | — | 1060 | 1010 |
| Tensile at Break, psi | 1150 | 1176 | 1037 | 886 | 665 | 790 | — | 1326 | — | — | 1236 | 1267 |
| Elongation at Break, % | 445 | 440 | 397 | 360 | 290 | 350 | — | 370 | — | — | 457 | 484 |
| Die C Tear Properties at 73° F. (23° C.) - slabs cured 40 minutes at 320° F. (160° C.) | | | | | | | | | | | | |
| Lbs./Inch | 151 | 153 | 145 | 124 | 113 | 122 | — | 199 | — | — | 236 | 238 |
| Shore "A" Hardness | | | | | | | | | | | | |
| Unaged - Tested at 73° C. (23° C.) | 63 | 63 | 64 | 65 | 65 | 65 | 74 | 72 | 63 | 59 | 64 | 65 |

Compared to walkway pads produced using various conventional elastomers, i.e., natural rubber, synthetic polyisoprene, styrene-butadiene rubber (SBR), polybutadiene and butyl (IR) rubber, walkway pads featuring EPDM have excellent tear properties, harden at a much slower rate under normal rooftop aging conditions as well as indoor accelerated aging conditions, and develop less shrinkage over an extended period of time at elevated temperatures. The process (paraffinic) oil used in an EPDM walkway pad is less volatile compared to an aromatic process oil commonly used in other walkway pads. The EPDM walkway pad compositions of the present invention are flexible and show excellent weathering performance properties including heat and ozone aging resistance. The EPDM walkway pad compositions also show better physical properties performance retention compared to other conventional polymeric walkway pads.

It is to be understood that the invention is not limited to the specific type of amorphous EPDM exemplified herein or by the disclosure or other EPDMs or EPMs, the examples having been provided merely to demonstrate practice of the subject invention. Those skilled in the art may readily select other EPDMs (and, in certain instances, EPMs) having the desired crystallinity characteristics. Similarly, the invention is not necessarily limited to the particular fillers and processing oil exemplified or the amounts thereof. In fact, with respect to the ground rubber, the processing aid, the carbon blacks, coal filler, and clay, it will be appreciated that these ingredients are essentially optional.

In conclusion, it should be clear from the foregoing examples and specification disclosure that a walkway pad containing 100 percent EPDM or a polymer blend of EPDM and EPM is highly desirable. With respect to the EPDMs, those EPDMs having up to 2 percent by weight crystallinity are particularly desirable, although a minor amount of EPDM having more than 2 percent by weight crystallinity may be employed. This composition provides a walkway pad which is suitable for use on the roof of a building.

It will be appreciated that any variables disclosed herein can readily be determined and controlled without departing from the scope of the invention herein disclosed and described. Moreover, the scope of the invention shall include all modifications and variations that fall within the scope of the attached claims.

What is claimed is:

1. A walkway pad consisting essentially of:
    100 parts by weight of at least one ethylene-propylene-diene terpolymer having up to 2 percent crystallinity;
    from about 150 to about 700 parts by weight of a filler selected from the group consisting of reinforcing and non-reinforcing materials and mixtures thereof, per 100 parts of the EPDM terpolymer; wherein said filler comprises from about 150 to about 275 parts by weight carbon black per 100 parts of the EPDM terpolymer,
    from about 107.5 to about 125 parts by weight of a processing material and mixtures thereof, per 100 parts of the EPDM terpolymer; and
    from about 2 to about 10 parts by weight of a cure package per 100 parts of the EPDM terpolymer, the walkway pad being devoid of any additional polymeric components.

2. A walkway pad, as set forth in claim 1, wherein said at least one ethylene-propylene-diene terpolymer consists of at least two ethylene-propylene-diene terpolymers having up to 2 percent by weight crystallinity.

3. A walkway pad, as set forth in claim 1, wherein said cure package is devoid of hexasulfides and thioureas.

4. A walkway pad, as set forth in claim 1, wherein said filler comprises from about 85 to about 175 parts by weight of carbon black, per 100 parts of the EPDM terpolymer, and said walkway pad includes from about 75 to about 115 parts by weight of said processing material, per 100 parts of the EPDM terpolymer.

5. A walkway pad, as set forth in claim 1, wherein said filler comprises from about 20 to about 300 parts by weight of a non-black mineral filler, per 100 parts of the EPDM terpolymer.

6. A walkway pad, as set forth in claim 1, wherein said cure package comprises from about 0.7 to 1.5 parts by weight sulfur and from about 1.5 to about 7 parts by weight of at least one sulfur vulcanizing accelerator.

7. A walkway pad, as set forth in claim 1, formed by the process of compression molding the pad.

8. A walkway pad, as set forth in claim 6, wherein said cure package contains 1 part by weight of sulfur and more than 1 part by weight of at least one sulfur vulcanizing accelerator.

9. A walkway pad, as set forth in claim 6, wherein said vulcanizing accelerators are selected from the group consisting of thiuram monosulfides and disulfides; benzothiazole sulfenamides; dithiocarbamates; 2-mercaptoimidazoline; N,N-diphenyl-guanadine; N,N-di-(2-methylphenyl)guanadine; 2-mercaptobenzothiazole; 2-(morpholinodithio)-benzothiazole disulfide; benzothiazyl disulfide; zinc 2-mercaptobenzothiazole and 4,4'-dithiodimorpholine.

10. A walkway pad, as set forth in claim 7, further including an adhesive disposed on a bottom surface of the pad after compression molding the pad.

11. A walkway pad consisting essentially of:
    100 parts by weight of at least one ethylene-propylene-diene terpolymer having up to 2 percent crystallinity;
    from about 60 to about 700 parts by weight of a filler selected from the group consisting of reinforcing and non-reinforcing materials and mixtures thereof, per 100 parts of the EPDM terpolymer;
    from about 107.5 to about 125 parts by weight of a processing material and mixtures thereof, per 100 parts of the EPDM terpolymer; and
    from about 2 to about 10 parts by weight of a cure package per 100 parts of the EPDM terpolymer, the walkway pad having a tensile strength of less than 1176 pounds per square inch tested at room temperature, and being devoid of any additional polymeric components.

12. The walkway pad of claim 11, wherein the filler comprises at least 100 parts by weight of cryogenically ground rubber per 100 parts of the EPDM terpolymer.

* * * * *